United States Patent
Hoogerbruggge et al.

(10) Patent No.: US 9,547,758 B2
(45) Date of Patent: Jan. 17, 2017

(54) PROGRAM CABLE OBFUSCATION BASED UPON RECENTLY EXECUTED PROGRAM CODE

(71) Applicant: NXP B.V., Eindhoven (NL)

(72) Inventors: Jan Hoogerbruggge, Helmond (NL); Wil Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/281,232

(22) Filed: May 19, 2014

(65) Prior Publication Data

US 2015/0332027 A1    Nov. 19, 2015

(51) Int. Cl.
    *G06F 21/00*     (2013.01)
    *G06F 12/14*     (2006.01)
    *G06F 21/14*     (2013.01)
    *G06F 9/45*     (2006.01)

(52) U.S. Cl.
    CPC ............. *G06F 21/14* (2013.01); *G06F 8/40* (2013.01); *G06F 2221/0748* (2013.01)

(58) Field of Classification Search
    CPC ........ G06F 21/14; G06F 21/125; G06F 21/52; G06F 21/6209; G06F 21/82; H04L 2209/16
    See application file for complete search history.

(56) References Cited

U.S. PATENT DOCUMENTS

| | | | | |
|---|---|---|---|---|
| 7,353,499 B2 * | 4/2008 | de Jong | ................. | G06F 21/10 713/190 |
| 8,220,058 B2 * | 7/2012 | de Jong | ................. | G06F 21/14 726/26 |
| 8,522,047 B2 * | 8/2013 | Eker | ................. | G06F 21/14 713/190 |
| 8,984,299 B1 * | 3/2015 | Yi | ................. | G06F 21/125 713/189 |
| 9,268,677 B2 * | 2/2016 | McLachlan | ................. | G06F 12/02 |
| 9,336,370 B2 * | 5/2016 | Chevallier-Mames | . | G06F 21/14 |
| 9,397,983 B2 * | 7/2016 | Moffat | ................. | H04L 63/08 |
| 2008/0162949 A1 * | 7/2008 | Sato | ................. | G06F 21/14 713/194 |
| 2009/0125728 A1 | 5/2009 | Kim et al. | | |
| 2013/0232323 A1 | 9/2013 | Lerouge et al. | | |
| 2014/0013451 A1 * | 1/2014 | Kulka | ................. | G06F 21/14 726/29 |
| 2014/0245271 A1 * | 8/2014 | Miller | ................. | G06F 21/14 717/146 |

(Continued)

FOREIGN PATENT DOCUMENTS

EP     2 196 937 A1     6/2010

OTHER PUBLICATIONS

LeDoux et al., Instruction embedding for improved obfuscation, Mar. 2012, 6 pages.*

(Continued)

*Primary Examiner* — Thuy Dao

(57) ABSTRACT

A method of obscuring software code including a plurality of instructions, comprising: determining, by a processor, a number N prior instructions to a current instruction; encoding the current instruction based upon a first function, a second function, and the N prior instructions, wherein the second function is based upon the N prior instructions, and wherein the first function is based upon the current instruction and an output of the second function.

18 Claims, 1 Drawing Sheet

(56) References Cited

U.S. PATENT DOCUMENTS

2015/0349968 A1* 12/2015 Dworak ............... H04L 9/3278
 380/28

OTHER PUBLICATIONS

Zink et al., Efficient BitTorrent handshake obfuscation, May 2012, 5 pages.*
Philippaerts et al., CPM: Masking Code Pointers to Prevent Code Injection Attacks, Jun. 2013, 27 pages.*
Schulze et al., On the robustness of clone detection to code obfuscation, May 2013, 7 pages.*
Tsui et al., Software protection with increased complexity and obfuscation, Mar. 2012, 2 pages.*
Extended European Search Report for application No. 15165106.4 (Oct. 22, 2015).
http://vmpsoft.com/support/user-manual/introduction/glossary/, 2003-2016 VMProtect Software, retrieved online on Sep. 8, 2016.
Rolles, R., "Unpacking Virtualization Obfuscators", https://www.usenix.org/legacy/event/woot09/tech/full_papers/rolles.pdf, 2009, 7 pages.

* cited by examiner

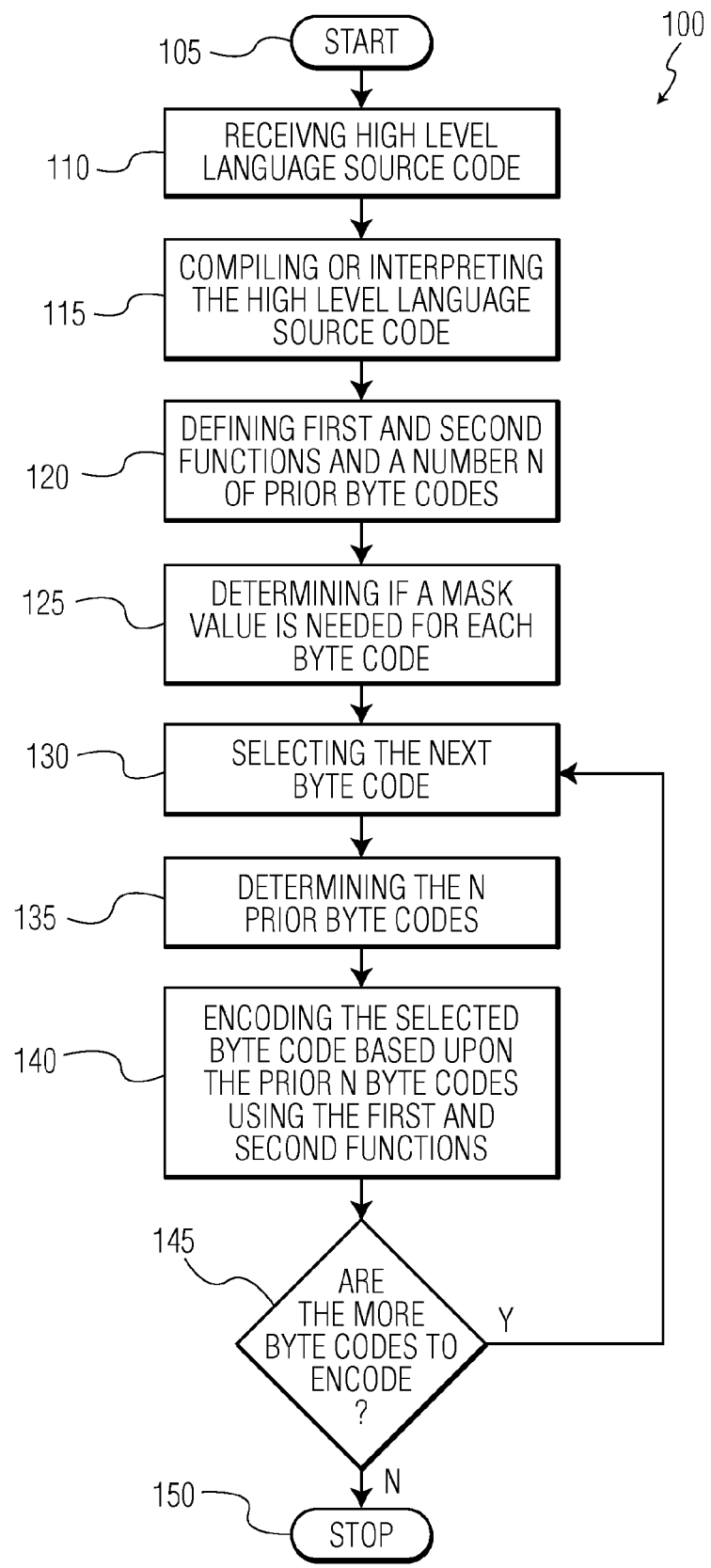

PROGRAM CABLE OBFUSCATION BASED UPON RECENTLY EXECUTED PROGRAM CODE

TECHNICAL FIELD

Various exemplary embodiments disclosed herein relate generally to program code obfuscation based upon recently executed program code.

BACKGROUND

Today software applications are widely used to provide various services to users. These software applications may be hosted on a variety of different devices, such as for example, mobile phones, personal computers, laptop computers, tablets, set top boxes, etc. Software applications are found in may systems in use by consumers or in industrial systems. Software applications are also found in smart cards and credit cards. Further, software applications may be implemented across networks such as the internet, where the software application runs on servers, and is accessed using various user devices. Many of these software applications require the use of security protocols to protect content, information, transactions, and privacy. Many software applications are run in environments where an attacker has complete or some control of the operation of the software application, and an attacker my attempt to reverse engineer the code of the software application in order to gain access to secure information or to even understand the operation of the software in order to reproduce or modify the functionality of the software application. An attacker may user various reverse engineering tools, such as for example, code analyzers and debuggers, to obtain information related to the software application. Accordingly, techniques have been developed to in order to make it hard for an attacker to reverse engineer software. One way to make reverse engineering of the code more difficult is code obfuscation. Code obfuscation seeks to create obfuscated code that is difficult for humans to understand. Code obfuscation may be used to conceal a software application's purpose or its logic, so as to prevent tampering or reverse engineering of the software application.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of obscuring software code including a plurality of instructions, including: determining, by a processor, a number N prior instructions to a current instruction; encoding the current instruction based upon a first function, a second function, and the N prior instructions, wherein the second function is based upon the N prior instructions, and wherein the first function is based upon the current instruction and an output of the second function.

Various embodiments are described further including: determining that there are join points in the N prior instructions or the current instruction; when there are join points, producing mask values for each of prior instructions before the join point, wherein the mask is set based upon common bits in the parallel instructions prior to the join point; and associating the mask with the current instruction.

Various embodiments are described further including: determining that there are join points in the N prior instructions or the current instruction; when there are join points, inserting I NOOP instructions before the join point, wherein I is the number of prior instructions before the join point.

Various embodiments are described further including: determining that there are join points in the N prior instructions or the current instruction; when there are join points, lowing the join point I instructions, wherein I is the number of prior instructions before the join point.

Various embodiments are described further including: receiving software code in a higher order language; and compiling the received software code into machine executable instructions.

Various embodiments are described further including: receiving software code in a higher order language; and interpreting the received software code into machine executable instructions.

Various embodiments are described further including: producing a key, wherein the key corresponds to N prior instructions for a first current instruction.

Various embodiments are described wherein the N prior instructions are N prior encoded instructions.

Various embodiments are described further including: determining, by a processor, a number of M prior data values associated with the N prior instructions prior to a current instruction; and wherein encoding the current instruction is further based upon the M data values, wherein the second function is further based upon the M prior data values.

Various embodiments are described further including: producing a key, wherein the key corresponds to N prior instructions and M prior data values for a first current instruction.

Further, various exemplary embodiments relate to a method of decoding obscured software code including a plurality of encoded instructions, including: determining, by a processor, a number N prior encoded instructions to a current encoded instruction; decoding the current encoded instruction based upon a first function, a second function, and the N prior decoded instructions, wherein the second function is based upon the N prior decoded instructions, and wherein the first function is based upon the current encoded instruction and an output of the second function.

Various embodiments are described further including: receiving a key, wherein the key corresponds to N prior instructions for a first encoded current instruction.

Further, various exemplary embodiments relate to a non-transitory machine-readable storage medium encoded with instructions for obscuring software code including a plurality of instructions for execution by a processor, the non-transitory machine-readable storage medium including: instructions for determining a number N prior instructions to a current instruction; instructions for encoding the current instruction based upon a first function, a second function, and the N prior instructions, wherein the second function is based upon the N prior instructions, and wherein the first function is based upon the current instruction and an output of the second function.

Various embodiments are described further including: instructions for determining that there are join points in the N prior instructions or the current instruction; instructions for producing mask values for each of prior instructions before the join point when there are join points, wherein the mask is set based upon common bits in the parallel instructions prior to the join point; and instructions for associating the mask with the current instruction.

Various embodiments are described further including: instructions for determining that there are join points in the N prior instructions or the current instruction; instructions for inserting I NOOP instructions before the join point when there are join points, wherein I is the number of prior instructions before the join point.

Various embodiments are described further including: instructions for determining that there are join points in the N prior instructions or the current instruction; instructions for lowing the join point I instructions when there are join points, wherein I is the number of prior instructions before the join point.

Various embodiments are described further including: instructions for receiving software code in a higher order language; and instructions for compiling the received software code into machine executable instructions.

Various embodiments are described further including: instructions for receiving software code in a higher order language; and instructions for interpreting the received software code into machine executable instructions.

Various embodiments are described further including: instructions for producing a key, wherein the key corresponds to N prior instructions for a first current instruction.

Various embodiments are described wherein the N prior instructions are N prior encoded instructions.

Various embodiments are described further including: instructions for determining, by a processor, a number of M prior data values associated with the N prior instructions prior to a current instruction; and wherein encoding the current instruction is further based upon the M data values, wherein the second function is further based upon the M prior data values.

Various embodiments are described further including: instructions for producing a key, wherein the key corresponds to N prior instructions and M prior data values for a first current instruction.

Further, various exemplary embodiments relate to a non-transitory machine-readable storage medium encoded with instructions for decoding obscured software code including a plurality of encoded instructions for execution by a processor, the non-transitory machine-readable storage medium including: instructions for determining a number N prior encoded instructions to a current encoded instruction; instructions for decoding the current encoded instruction based upon a first function, a second function, and the N prior decoded instructions, wherein the second function is based upon the N prior decoded instructions, and wherein the second function is based upon the current encoded instruction and an output of the second function.

Various embodiments are described further including: instructions for receiving a key, wherein the key corresponds to N prior instructions for a first encoded current instruction.

BRIEF DESCRIPTION OF THE DRAWINGS

In order to better understand various exemplary embodiments, reference is made to the accompanying drawings, wherein:

FIG. 1 illustrates a method of obscuring software code.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A software application may be implemented using program code. The program code may be written in a higher order language. That program code may then be compiled or interpreted. The compiled code may be machine code directed to a specific processor, where the compiled code uses instructions from the instruction set for the specific processor. Further, the code may be compiled into byte codes. Byte codes are codes that represent various operations. The byte codes may then be further interpreted to be implemented on specific processor. Such a technique may be for example used with virtual machines (VM). The VM may then be implemented to run on various processors, but the byte code will be the same for an application that is to be implemented on any processor, as the VM operates on the byte codes which are then interpreted by the VM into machine code for the specific processor.

In many situations software applications have to be protected against attackers that attempt to reverse engineer the code, such as in the examples mentioned above. Attackers may use sophisticated tools to analyze software in binary form to understand what the software is doing and how the software works. Code obfuscation may be used to implement the software application in order to make it harder for an attacker to understand the operation of the code, to modify the code, to move the code, or to extract sensitive information from the code. Because an attacker only has access to the executable code and not the source code, obfuscation techniques typically are applied to the executable code.

One way to obfuscate the code is to make the decoding of the code (which is necessary to execute the code) dependent on recently executed code. Below embodiments are described using byte codes implemented in a VM. The techniques described in the embodiments, however, may be applied more broadly to other types of code and processors. Further, the embodiments also protect an application against tampering in addition to obfuscating the code.

In many cases one wants to run software on an open platform where the execution of the software can be observed easily but one wants to hide what the software is actually doing. This may be done using software obfuscation. It is typically applied to protect intellectual property used in software from being stolen and hiding the internal processing of software where security is involved.

Several tools are available to obfuscate software (ExeCryptor, VMProtect, Code Virtualizer, Thermida). Many of them translate the software to be protected to a virtual machine (VM) where the instructions of the VM are secret as well as how they are encoded in memory. The software obfuscation tool also delivers an interpreter so that the VM knows the VM instructions and how they are encoded in memory. The interpreter combined with the translated application code forms the obfuscated application.

A very popular method to create fast interpreters (so that the overhead of code obfuscation is low) is to use byte codes. A program for a byte code VM consists of a number of bytes where the byte value indicates the operation to be executed. For example byte value 12 could denote a multiply and byte value 13 could denote a subtraction. Immediate operands may be found between the byte codes that are inputs to the operations to be performed by the VM. For example, byte code 14 could denote an addition of a 16 bit constant to some variable where the constant is obtained from the two bytes that follow the byte code.

An overview of the embodiments will now be described. The embodiments described encode the byte codes off line (when the VM code is generated) and decode them during interpretation. The encoding of a byte code makes use of the most recently executed byte codes. In order to encode byte code B, and where the uncoded byte code before executing B was $L_1$, and the one before $L_1$ was $L_2$, etc., then the encoded value for B called B' is:

$$B'=f(B,g(L_1, \ldots L_n)).$$

For improved security, the $L_1, \ldots L_n$ values may be uncoded byte codes but the invention is also valid if $L_1, \ldots L_n$ contains coded byte codes. During execution, the interpreter decodes the fetched byte code as follows:

$$B=f^{-1}(B',g(L_1, \ldots L_n)).$$

Where $f^{-1}$ is the inverse of function f in the following sense:

$$f^{-1}(f(x,y),y)=x$$

After having executed byte code B, then values $L_1, \ldots L_n$ are shifted by one position where $L_n$ is discarded and the new $L_1$ becomes B. In other words:

$$L_n = L_{n-1}$$
$$L_{n-1} = L_{n-2}$$
$$\ldots$$
$$L_2 = L_1$$
$$L_1 = B.$$

By encoding the byte codes as presented, the information that is needed to decode them becomes only available during the execution of the code.

Branches in the code where certain code locations are reachable via several control paths mean that $L_1, \ldots L_n$ is not uniquely determined at these points in the code. How to deal with this problem will be described below.

Two embodiments will now be described. A first embodiment is to use the following configuration for f, g, and n:

$$f(x,y)=x-y$$
$$g(x)=x$$
$$n=1$$

Because a byte code is encoded with the difference between its value and the last executed byte code, this embodiment may be called differential byte codes. The interpreter decodes the encoded byte codes by applying $f^{-1}$ which is addition. For correct operation, the subtraction in f and the addition in f should wrap around in the 0 . . . 255 range of a byte value.

A second embodiment may use:

$$f(x,y)=x \text{ xor } y$$
$$g(x_1,x_2)=S[x_1] \text{ xor } S[x_2]$$
$$n=2$$

Where xor stands for exclusive or and S[x] is a substitution operation that maps a byte to a byte. The S[ . . . ] mapping may have no structure so that it is hard for the attacker to analyze how the code is coded and decoded.

As described in the previous section, $L_1, \ldots L_n$ is not unique if there are join points in the code where jumps are used to jump to a different point in the code, which happens frequently. For example, consider these 4 byte uncoded codes where there is a jump entry target at code B3:

|   |    |
|---|----|
|   | B1 |
|   | B2 |
| J:| B3 |
|   | B4 |

Depending on whether B3 is executed after B1 and B2 or via a jump to join point J, the execution history in $L_1, \ldots L_n$ will be different. There are different ways to solve this issue. A first method is to associate every previous byte code with n mask values that should be applied on $L_i$ before using it for encoding or decoding. The mask indicates which bits have the same value in all execution paths leading to the byte code. That is, for any byte codes before the join point that share a parallel location in the execution history, with other byte codes, the mask is based upon the common bits found in the parallel byte codes. Encoding and decoding then become:

$$B'=f(B,g(L_1 \text{ and } M_1 \ldots L_n \text{ and } M_n))$$

$$B=f^{-1}(B',g(L_2 \text{ and } M_1 \ldots L_n \text{ and } M_n))$$

With the masks $M_i$ we remove the bits from $L_i$ that should not be used as argument for g because they are not constant. The masks could be stored adjacent to the byte codes in memory.

A second method is to make sure that $L_1, \ldots L_n$ is always unique. This is always possible by putting n no-ops (byte codes that have no effect) before a label J and before a jump that targets J. So if n=2, the example above becomes:

|   |      |
|---|------|
|   | B1   |
|   | B2   |
|   | NOOP |
|   | NOOP |
| J:| B3   |
|   | B4   |
|   | NOOP |
|   | NOOP |
|   | Jump J |

A third method is to lower the label J and to copy n byte codes to a position before the jump that targets J. The example above becomes for n=1:

|   |      |   |
|---|------|---|
|   | B1   |   |
|   | B2   |   |
|   | B3   |   |
| J:| B4   |   |
|   | B3   | //copied from original J position |
|   | Jump J |   |

After this transformation, $L_1$ is always B3 for B4. Originally the code would jump to code to B3 as indicated by the label J. Instead the label J is lowered one instruction to code B4 and the instruction B3 is placed before the jump instruction in the other portion of the code with the jump instruction. If n were 2 then the jump target would move down two instructions and two instruction would be placed before the jump instruction.

In both the second and third methods, using the no-ops and copying byte codes, the jump byte code should not be used to update the execution history $L_1, \ldots L_n$ with its own byte code.

The embodiments above have only described encoding byte codes (i.e., the bytes that specify the operation to be performed) and not the intermediate data that is located between byte codes in typical VMs. Applying the technique on intermediate data is a straightforward extension.

In an embodiment encoding the intermediate data, the $L_1 \ldots L_n$ values need an initial value prior to execution of the protected code. This initial value may then also serve as a key to the program. If the correct values are not available, the code cannot be executed correctly.

With advanced abstract interpretation techniques an attacker might try values for $L_1 \ldots L_n$ and when the attacker is confident that they have found the right values, propagate this information through the code by means of abstract interpretation in order to decode it. This task may be made harder by choosing a larger value for n, although this would increase interpretation overhead and increase the costs of the techniques to deal with the join points in the code. Another method is to generate byte code that sets the $L_1 \ldots L_n$ to a computed constant value at certain places in the code. For example, a bytecode may copy $R_0$ to $L1 \ldots L_n$ where $R_0$ is a register of a virtual machine. Before executing this instruction, the register $R_0$ has been given a value by a piece of code that computes for example gcd(12341,3131) (greatest common denominator). As a result the abstract interpretation tool cannot figure out the constant value that is produced. This may prevent an attack with abstract interpretation at these places in the code.

While a goal of the embodiments described herein is to obfuscate program code, these embodiments are also useful for protecting the code against tampering. If an attacker tries to figure out the position of a critical byte code in the code and to replace that one by another byte code in order to achieve his goal of altering the operation of the code, then the attacker would also change the interpretation of the byte codes that follow modified byte code. As a result, the code that follows becomes 'garbage' code.

As mentioned above, the embodiments described herein for obfuscating byte codes may be applied to other types of software programs. These embodiments may also be applied to, for example, an ARM processor core that is extended with (hardware) decoding functionality and where the encoding is implemented in a compiler for the ARM processor.

The embodiments described herein may be implemented in a compiler that compiles a higher order language into machine code for execution on a processor. Further, the embodiments described herein may be implemented in an interpreter that interprets program instructions into machine code for execution on a processor. Also, the embodiments may be applied to existing machine or other executable code to obscure the operation of that machine code.

FIG. 1 illustrates a method of obscuring software code. The method 100 may begin at 105. Next, the method may receive high level language source code 110. Then the method 100 may compile or interpret the high level language source code 115. Next, the method 100 may define a first and second function, such as f and g described above, and the number of prior byte codes to use in encoding each byte code 120. Then the method 100 may for each byte code determine if a mask value is needed 125. Alternatively, at this step n NOOP byte codes may be added before any byte code that is the destination of a jump instruction. Further, any jump destinations may instead be lowered as described above. Then the next byte code to be processed is selected 130. Next the method 100 may determine the n prior byte codes 135. Then the current byte code may be encoded using the last n byte codes and the first and second function 140 as described above. Next, the method 100 may determine if there are more byte codes to encode 145? If so, then the method selects the next byte code for processing 130 and repeats the steps 135 and 140. If not, then the method 100 ends at 150.

The method may also include using the intermediate data values to encode any given byte code as described above. This method may all be performed in a compiler when code is compiled. Also, many of the steps may be applied independent of the compiler after the code has been compiled. Various aspects of the steps in the method 100 are discussed in the embodiments described above. Further, this method may work on machine code or other types of computer instructions in order to obfuscate their operation.

A method according to the embodiments of the invention may be implemented on a computer system as a computer implemented method. Executable code for a method according to the invention may be stored on a computer program medium. Examples of computer program media include memory devices, optical storage devices, integrated circuits, servers, online software, etc. Such a computer system, may also include other hardware elements including storage, network interface for transmission of data with external systems as well as among elements of the computer system.

In an embodiment of the invention, the computer program may include computer program code adapted to perform all the steps of a method according to the invention when the computer program is run on a computer. Preferably, the computer program is embodied on a non-transitory computer readable medium.

A method of creating the obscured code according to the invention may be implemented on a computer as a computer implemented method. Executable code for a method according to the embodiments may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of obscuring software code including a plurality of instructions, comprising:
   determining, by a processor, a number N prior instructions to a current instruction, wherein N is an integer and greater than zero;
   encoding the current instruction based upon a first function, a second function, and the N prior instructions,
   determining that there are join points in the N prior instructions or the current instruction;
   when there are join points, producing mask values for each of prior instructions before the join point, wherein the mask is set based upon common bits in the parallel instructions prior to the join point; and
   associating the mask with the current instruction;
   wherein the second function is based upon the N prior instructions, and
   wherein the first function is based upon the current instruction and an output of the second function.

2. The method of claim 1, further comprising:
   determining that there are join points in the N prior instructions or the current instruction;
   when there are join points, inserting I NOOP instructions before the join point, wherein I is the number of prior instructions before the join point, and wherein I is an integer and greater than zero.

3. The method of claim 1, further comprising:
   determining that there are join points in the N prior instructions or the current instruction;
   when there are join points, lowing the join point I instructions, wherein I is the number of prior instructions before the join point.

4. The method of claim 1, further comprising:
   receiving software code in a higher order language; and
   compiling the received software code into machine executable instructions.

5. The method of claim 1, further comprising:
   receiving software code in a higher order language; and
   interpreting the received software code into machine executable instructions.

6. The method of claim 1, further comprising: producing a key, wherein the key corresponds to N prior instructions for a first current instruction.

7. The method of claim 1, wherein the N prior instructions are N prior encoded instructions.

8. The method of claim 1, further comprising:
   determining, by a processor, a number of M prior data values associated with the N prior instructions prior to a current instruction, wherein M is an integer and greater than zero; and
   wherein encoding the current instruction is further based upon the M data values, wherein the second function is further based upon the M prior data values.

9. The method of claim 8, further comprising: producing a key, wherein the key corresponds to N prior instructions and M prior data values for a first current instruction.

10. A non-transitory machine-readable storage medium encoded with instructions for obscuring software code including a plurality of instructions for execution by a processor, the non-transitory machine-readable storage medium comprising:
   instructions for determining a number N prior instructions to a current instruction, wherein N is an integer and greater than zero;
   instructions for encoding the current instruction based upon a first function, a second function, and the N prior instructions,
   instructions for determining that there are join points in the N prior instructions or the current instruction; and
   instructions for inserting I NOOP instructions before the join point when there are join points, wherein I is the number of prior instructions before the join point, and wherein I is an integer and greater than zero;
   wherein the second function is based upon the N prior instructions, and
   wherein the first function is based upon the current instruction and an output of the second function.

11. The non-transitory machine-readable storage medium of claim 10, further comprising:
   instructions for determining that there are join points in the N prior instructions or the current instruction;
   instructions for producing mask values for each of prior instructions before the join point when there are join points, wherein the mask is set based upon common bits in the parallel instructions prior to the join point; and
   instructions for associating the mask with the current instruction.

12. The non-transitory machine-readable storage medium of claim 10, further comprising:
   instructions for determining that there are join points in the N prior instructions or the current instruction;
   instructions for lowing the join point I instructions when there are join points, wherein I is the number of prior instructions before the join point.

13. The non-transitory machine-readable storage medium of claim 10, further comprising:
   instructions for receiving software code in a higher order language; and
   instructions for compiling the received software code into machine executable instructions.

14. The non-transitory machine-readable storage medium of claim 10, further comprising:
   instructions for receiving software code in a higher order language; and
   instructions for interpreting the received software code into machine executable instructions.

15. The non-transitory machine-readable storage medium of claim 10, further comprising: instructions for producing a key, wherein the key corresponds to N prior instructions for a first current instruction.

16. The non-transitory machine-readable storage medium of claim 10, wherein the N prior instructions are N prior encoded instructions.

17. The non-transitory machine-readable storage medium of claim 10, further comprising:
   instructions for determining, by a processor, a number of M prior data values associated with the N prior instructions prior to a current instruction, wherein M is an integer and greater than zero; and
   wherein encoding the current instruction is further based upon the M data values, wherein the second function is further based upon the M prior data values.

18. The non-transitory machine-readable storage medium of claim 17, further comprising: instructions for producing a key, wherein the key corresponds to N prior instructions and M prior data values for a first current instruction.

* * * * *